United States Patent [19]

Aronberg

[11] 3,970,238

[45] July 20, 1976

[54] SOLDERING OF STAINLESS STEELS
[75] Inventor: Lester Aronberg, Chicago, Ill.
[73] Assignee: Lake Chemical Company, Chicago, Ill.
[22] Filed: Jan. 31, 1973
[21] Appl. No.: 328,471

Related U.S. Application Data

[63] Continuation-in-part of Ser. No. 202,616, Nov. 26, 1971, abandoned, which is a continuation-in-part of Ser. No. 849,174, Aug. 11, 1969, Pat. No. 3,660,127.

[52] U.S. Cl. .................................. 228/207; 228/223
[51] Int. Cl.$^2$ ........................................ B23K 35/36
[58] Field of Search ............. 24/495, 496; 148/6.15, 148/24, 26

[56] References Cited
UNITED STATES PATENTS

| | | | |
|---|---|---|---|
| 2,171,041 | 8/1939 | Michel | 29/495 |
| 2,465,750 | 3/1949 | Reid | 29/495 UX |
| 2,845,700 | 8/1958 | Bogno | 29/495 |
| 2,987,817 | 6/1961 | Kozlik | 148/26 UX |
| 3,660,127 | 5/1972 | Aronberg | 148/26 X |

FOREIGN PATENTS OR APPLICATIONS

| | | | |
|---|---|---|---|
| 856,661 | 9/1957 | Japan | 29/495 |
| 400,609 | 3/1933 | United Kingdom | 29/495 |

OTHER PUBLICATIONS
Soldering Manual, prepared by American Welding Society Committee on Brazing and Soldering, 1959, pp. 103–108.

*Primary Examiner*—Ronald J. Shore
*Attorney, Agent, or Firm*—Wallenstein, Spangenberg, Hattis & Strampel

[57] ABSTRACT

Soldering of stainless steels utilizing soft solders and, in conjunction therewith, flux compositions containing a major proportion of orthophosphoric acid and a minor proportion of a mono- or di-ammonium phosphate, or an amine mono- or di-orthophosphate, advantageously in the presence of water, and desirably in admixture with various supplemental materials, said compositions containing at least 50% of free orthophosphoric acid.

8 Claims, No Drawings

SOLDERING OF STAINLESS STEELS

This application is a continuation-in-part of application Ser. No. 202,616, filed Nov. 26, 1971, now abandoned, which, in turn, is a continuation-in-part of application Ser. No. 849,174, filed Aug. 11, 1969, now U.S. Pat. No. 3,660,127.

This invention relates to the soldering of stainless steels, particularly in sheet or strip form, utilizing soft solders in conjunction with certain fluxes.

In the soldering of stainless steels, various fluxes have been suggested, such as zinc chloride or zinc chloride and hydrochloric acid, but they are corrosive, commonly cause pitting, and have been found to be quite unsatisfactory. Where they are utilized, it is necessary to neutralize the flux residues and then to wash with water. Apart from the time consumption involved in such operations, it is, at times, difficult to get access to such residues, and pitting and corrosion commonly cannot be avoided. Perhaps the most satisfactory of the fluxes used in the soldering of stainless steels is orthophosphoric acid. However, orthophosphoric acid, too, has certain objections. While it is generally non-corrosive towards stainless steels during the actual fluxing operations, it fails to bring about fully satisfactory soldered joints due to the fact that it has inadequate wetting, spreading and capillary action, even when used in high concentrations.

It has also heretofore been suggested, as disclosed in British Patent No. 400,609, in connection with the soldering of stainless steels, to utilize as fluxes orthophosphoric acid neutralized with ammonia or organic bases such as aniline, pyridine, and toluidine. In a specific embodiment in said British patent, the orthophosphoric is fully neutralized with the base so that no free orthophosphoric is present, but the patent states, generally, that the proportions of the orthophosphoric acid and the base are such as to leave, in the flux composition, an excess of either the orthophosphoric acid or of the base after the formation of the phosphate or phosphates resulting from the neutralization. Tests made with compositions which are specifically disclosed and taught by said patent have shown that they are unsatisfactory since they spread poorly in the space between adjoining sheets of steel, have inadequate capillary action, and achieve relatively poor and inadequate bonding of the stainless steel sheets being soldered.

It has been found, in accordance with the present invention, that the soldering of stainless steels with soft solders can be markedly improved by utilizing, as the flux, flux compositions consisting essentially of a phosphorus-containing acid in admixture with one or more mono- and di-ammonium phosphate salts and/or one or more amine mono- and di-salts of phosphoric acids, hereafter described in detail, and, in the particularly preferred embodiments of the invention, certain additional ingredients, provided, however, that said flux compositions contain a minimum of 50% of free phosphorus-containing acid and, better still, at least 100% free phosphoric acid, based upon the weight of the ammonium or organic amine mono- and/or di-phosphates present in said flux compositions. Thus, by way of illustration, if the flux composition contains 100 g of monoammonium diacid phosphate ($NH_4H_2PO_4$), the free phosphorus-containing acid, for instance, $H_3PO_4$, must constitute a minimum of 50 g and, better still, 100 g or more, say up to about 300 g or even substantially more. The resulting fluxes are characterized by excellent resistance to corrosive effects, and substantially improved wetting, spreading and capillary action, and they enable clean, soldered joints to be obtained which are characterized by excellent strength due to good surface coverage of the interface between the stainless steel and the metal to which it is soldered which, desirably, is also stainless steel.

Of the phosphorus-containing acids, orthophosphoric acid is most advantageously utilized, both from the standpoint of its functioning and its commercial availability and low cost, but phosphorous acid (usually available in aqueous solution in 70–72% concentrations) can be employed. The orthophosphoric acid may be in the form of aqueous orthophosphoric acid containing as low as 40% orthophosphoric acid, or it may be as high as about so-called commercial 115% phosphoric acid, but it is preferred to utilize about 75% to 105% orthophosphoric acid.

There is admixed with the orthophosphoric acid or other phosphorus-containing acid one or more of monoammonium phosphate ($NH_4H_2PO_4$) or diammonium phosphate ($NH_4)_2HPO_4$ or monobasic or diabasic organic amine phosphates, the organic amine containing from 1 to 6 carbon atoms.

Illustrative of the foregoing amines are amines selected from the group consisting of alkylamines (including cycloalkylamines), alkenylamines, hydroxyalkyl mono- and di-amines, alkylene-polyamines, and heterocyclic amines, and they may be saturated or unsaturated, straight chain or branched chain, although it is particularly preferred that they be saturated, straight chain alkylamines. Said amines should be unsubstituted and they will, therefore, contain only carbon, hydrogen and nitrogen, except in the case of those amines of the types referred to above which contain hydroxy groups and those which may contain oxygen in an ether grouping.

Illustrative examples of the foregoing types of amines, which examples may be selected from a wide group include such alkylamines (including cycloalkylamines) as methylamine, dimethylamine, ethylamine, diethylamine, triethylamine, n-propylamine, isopropylamine, n-butylamine, isobutylamine, n-amylamine, isoamylamine, n-hexylamine, isohexylamine, and cyclohexylamine; alkenylamines such as allylamine and methallylamine; alkylenepolyamines such as ethylenediamine, diethylenetriamine and triethylenetetramine; hydroxyalkyl mono- and di- amines such as monoethanolamine, diethanolamine, triethanolamine, and commercial mixtures of said ethanolamines, n-propanolamine, mono-isopropanolamine, diisopropanolamine, and commercial mixtures of said isopropanolamine, diethylethanolamine 2-amino-2-methyl-1-propanol, and 2-amine-1-butanol, and glycerolamines, hydroxyalkyl alkylene polyamines such as hydroxyethyl ethylenediamine and hydroxyethyl diethylenetriamine, polyoxyalkyleneamines such as are represented by the formula

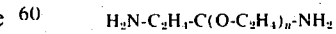

where n is an integer from 1 to 2; aniline; and heterocyclic amines such as morpholine, pyridine, methylpyridine, piperidine and methylpiperidine; and compatible mixtures of any two or more thereof.

The foregoing ammonium and organic amine phosphates may be preformed and admixed, as such, with the phosphorus-containing acid, notably orthophosphoric acid, or they may be formed in situ by adding ammonia or ammonium hydroxide, or the organic amine, to the phosphorus-containing acid in requisite or controlled amounts. The said ammonium and/or organic amine phosphates will in most cases range from about 15 to about 35% by weight of the phosphorus-containing acid. It may also here be pointed out that it is preferred that the soldering flux be in the form of a liquid, although it can be converted into a paste, if desired. Furthermore, when used in the form of a liquid, it is desirable that the ammonium or organic amine phosphate salts be in solution in the phosphorus-containing acid. However, the fluxes are operative even in those instances where said phosphate salts may be used in amounts as to exceed their solubility in the flux composition.

It is generally advantageous to incorporate added water as an ingredient of the flux compositions used in accordance with the present invention. To be sure, water is present in the phosphorus-containing acids of commerce, the amount thereof varying depending, for instance, on whether said acid is 75%, 105% or 115% orthophosphoric acid. The added water serves, among other things, to provide for a flux of liquid character, of desired viscosity, aids in effecting solution of the ammonium and/or organic amine phosphate salts in the flux compositions, and brings about improved fluxing action. Generally it is desirable to add about 10 to about 15% water, based on the weight of the phosphorus-containing acid, for instance, 75–105% orthophosphoric acid.

Various supplemental agents can be added to obtain particular effects. Thus, for instance, surfactants, especially of the nonionic type and exemplified by normally solid, paste or liquid "PLURONICS" (Wyandotte Chemicals Corp.) and "IGEPAL CO-730" (GAF Corporation) are desirably incorporated. The "PLURONICS," as is well known, are condensates or adducts of ethylene oxide with hydrophobic bases, in the form of polyoxypropylene glycols generally having a molecular weight of 1,200 or higher, and are disclosed, for example, in U.S. Pat. Nos. 2,674,619 and 2,677,700. Other nonionic surfactants can be used such as ethylene oxide adducts of $C_{12}$-$C_{20}$ linear and branched chain alcohols, including Oxo alcohols, and ethylene oxide adducts of $C_9$-$C_{18}$ alkyl phenols, said nonionic surfactants being, per se, well known and being disclosed in many U.S. Pat. Nos. as, for instance, in 1,970,578; 2,965,678 and as intermediates in 3,004,056. "IGEPAL CO-730" is a nonylphenoxypoly (ethyleneoxy) ethanol and is exemplary of said latter surfactants. The nonionic surfactants function, in certain instances, to improve the homogeneity of the fluxes, and they also tend to enhance the wetting and spreading properties of the fluxes during the soldering operation. The surfactants, where utilized, are desirably employed in amounts of about 0.1% to 1%, particularly 0.2 to 0.5%, by weight of the phosphorus-containing acid.

The following examples are illustrative of fluxes useful in the practice of the invention. It will be understood that numerous other fluxes can be made for use in the practice of the invention in the light of the guiding principles and teachings disclosed above. All parts listed are by weight.

EXAMPLE 1

| | |
|---|---|
| Orthophosphoric acid (75%) | 100 |

-continued

| | |
|---|---|
| Monoammonium phosphate | 36 |
| Water | 14 |
| "IGEPAL CO-730" | 0.4 |

The ingredients may be mixed together in any suitable order. Thus, for instance, the monoammonium phosphate may be dissolved in a water solution of the "IGEPAL CO-730", and then the orthophosphoric acid is added, with stirring. The resulting flux is a liquid of slightly viscous character.

EXAMPLE 2:

| | |
|---|---|
| Orthophosphoric acid (75%) | 100 |
| Di-ammonium phosphate | 17 |
| Water | 7 |
| "IGEPAL CO-730" | 0.3 |

EXAMPLE 3:

| | |
|---|---|
| Orthophosphoric acid (75%) | 100 |
| Monoammonium phosphate | 33 |
| Water | 15 |

EXAMPLE 4:

| | |
|---|---|
| Orthophosphoric acid (75%) | 100 |
| Monoammonium phosphate | 23 |
| Di-ammonium phosphate | 6.5 |
| Water | 15 |

EXAMPLE 5:

| | |
|---|---|
| Orthophosphoric acid (105%) | 100 |
| Ammonium hydroxide (28%) (to be added gradually to the phosphoric acid) | 19 |
| Water | 28 |

EXAMPLE 6:

| | |
|---|---|
| Orthophosphoric acid (75%) | 100 |
| Ethylamine orthophosphate (dibasic) | 16 |
| Water | 15 |
| "IGEPAL CO-730" | 0.3 |

EXAMPLE 7:

| | |
|---|---|
| Orthophosphoric acid (75%) | 100 |
| Isopropylamine orthophosphate (monobasic) | 26 |
| Water | 13 |

EXAMPLE 8:

| | |
|---|---|
| Orthophosphoric acid (75%) | 100 |
| Cyclohexylamine orthophosphate (dibasic) | 25 |
| Water | 14 |
| "IGEPAL CO-730" | 0.4 |

EXAMPLE 9:

| | |
|---|---|
| Orthophosphoric acid (75%) | 100 |
| Isobutylamine orthophosphate (dibasic) | 22 |

-continued

Water                                              13

EXAMPLE 10:

| | |
|---|---|
| Orthophosphoric acid (75%) | 100 |
| Monoammonium orthophosphate | 22 |
| Ethylamine orthophosphate (dibasic) | 8 |
| Water | 13 |
| "IGEPAL CO-730" | 0.4 |

EXAMPLE 11:

| | |
|---|---|
| Phosphorous acid (70–72%) | 100 |
| Monoammonium orthophosphate | 26 |
| Water | 13 |
| "IGEPAL CO-730" | 0.4 |

EXAMPLE 12:

| | |
|---|---|
| Orthophosphoric acid (75%) | 100 |
| Aniline orthophosphate (monobasic) | 20 |
| Water | 12 |

The stainless steels which can be soldered with the fluxes employed in accordance with the present invention can be chosen from among the many which are well known to the art. Illustrative of such stainless steels are those containing chromium, for instance, of the order of 18% chromium; those containing chromium and titanium, for instance, those containing of the order of 12% chromium and 2% titanium; those containing varying proportions of chromium and nickel; and those containing varying proportions of chromium, titanium, nickel and vanadium. Illustrative of such stainless steels are those sold commercially under the trade designations 300 series and 400 series, and are used in both outside applications where they would be subjected to weathering conditions, and inside applications such as sinks, process equipment and the like. The invention is of especial value in connection with the soldering of stainless steel sheets, to make gutters, flashings, roofing sheets, fascia, and the like, using, for instance, series 304 stainless steels.

In soldering the stainless steels to form seams or joints with various metals, which latter may be stainless steels of the same or different character, or which may be copper, copper-base alloys and copper-containing alloys, or non-stainless steels, and the like, various soft solders can be employed such as, for instance, 50% tin–50% lead; 60% tin–40% lead; 95% tin–5% antimony; 100% tin; 40% tin–60% lead; 30% tin–70% lead; 95% tin–5% silver; 97½% tin–2½% silver; and variants of such solders and other known soft solders. It is especially desirable to use approximately 50% tin–50% lead solders since they have good flow properties at relatively low temperatures. Conventional soldering techniques and conventional soldering temperatures, generally of the order of about 350°F to about 625°F are used, being employed in the same general manner in which zinc chloride, or zinc chloride in admixture with hydrochloric acid, or orthophosphoric acid have heretofore been used as a flux so that no detailed explanation is necessary. Where gutters are made, for instance, the heat utilized in the soldering operation may be supplied by a hot iron or a torch or the like.

I claim:

1. In a method for the soldering of stainless steel in the form of sheets or strips and in which a soft solder and a soldering flux are utilized, the improvement which comprises utilizing as said flux a composition which is in the form of a liquid containing added water and which consists essentially of at least one phosphorus-containing acid selected from the group consisting of phosphoric acid and phosphorous acid, and at least one phosphate salt selected from the group of monoammonium phosphate, diammonium phosphate, and amine mono- and di-phosphates in which the amine contains from 1 to 6 carbon atoms, said composition containing at least 50% of free phosphorus-containing acid, said phosphate salt being in solution in said liquid, said salt constituting, by weight, from about 10% to 50% of the phosphorus-containing acid.

2. The method of claim 1 in which the phosphorus-containing acid of said flux comprises 75–105% orthophosphoric acid. IGEPAL 3. The method of claim 2 in which said flux includes a minor proportion of a nonionic surfactant.

4. The method of claim 1 in which the following ingredients are present in approximately the stated parts by weight in said flux:

| | |
|---|---|
| Orthophosphoric acid (75–105%) | 100 |
| Monoammonium and/or diammonium phosphate | 15–35 |
| Water | 10–15. |

5. The method of claim 1 in which the following ingredients are present in approximately the stated parts by weight in said flux:

| | |
|---|---|
| Orthophosphoric acid (75%) | 100 |
| Monoammonium phosphate | 36 |
| Water | 14. |

6. The method of claim 1 in which the following ingredients are present in approximately the stated parts by weight in said flux:

| | |
|---|---|
| Orthophosphoric acid (75%) | 100 |
| Diammonium phosphate | 17 |
| Water | 7. |

7. In a method for the soldering of stainless steel in which a soft solder and a soldering flux are utilized, the improvement which comprises utilizing as said flux a composition which is in the form of a liquid containing added water and which consists essentially of at least one phosphorus-containing acid selected from the group consisting of phosphoric acid and phosphorous acid, and at least one phosphate salt selected from the group of monoammonium phosphate, diammonium phosphate, and amine mono- and di-phosphates in which the amine is an alkylamine containing from 1 to 3 carbon atoms, said composition containing at least 50% of free phosphorus-containing acid.

8. The method of claim 7 in which the phosphorus-containing acid of said flux is 75–105% orthophosphoric acid.

* * * * *